US005639172A

United States Patent [19]

Erickson

[11] Patent Number: 5,639,172

[45] Date of Patent: Jun. 17, 1997

[54] PHOTOGRAPHIC DEVICE AND METHOD FOR MAKING AND STORING PHOTOGRAPHIC CONTACT PRINTS

[76] Inventor: Pamalee B. Erickson, 3701F Randall Dr., Jefferson City, Mo. 65109

[21] Appl. No.: 289,880

[22] Filed: Aug. 12, 1994

[51] Int. Cl.$^{6}$ .................... G03B 27/04

[52] U.S. Cl. .................... 402/79; 355/127

[58] Field of Search .................... 402/79, 4, 80 R; 281/38

[56] References Cited

U.S. PATENT DOCUMENTS

| | | | |
|---|---|---|---|
| 1,072,444 | 9/1913 | Froendt | 355/127 |
| 2,807,199 | 9/1957 | Alberti . | |
| 3,446,260 | 5/1969 | Osher . | |
| 3,555,713 | 1/1971 | Leinbach . | |
| 3,816,948 | 6/1974 | Mooney et al. . | |
| 4,239,386 | 12/1980 | Moore | 355/127 X |
| 4,629,070 | 12/1986 | Roberg | 402/79 X |
| 4,965,948 | 10/1990 | Ruebens . | |
| 5,000,319 | 3/1991 | Mermelstein | 402/79 X |
| 5,186,566 | 2/1993 | Cameron . | |
| 5,431,449 | 7/1995 | Arimoto et al. | 402/79 X |
| 5,459,549 | 10/1995 | Barr | 355/127 X |

*Primary Examiner*—Willmon Fridie, Jr.
*Attorney, Agent, or Firm*—Polster, Lieder, Woodruff & Lucchesi

[57] ABSTRACT

A system and method for making and storing photographic contact prints includes a device formed of thermoplastic film having pockets on one side for holding negative strips, a pocket on its other side for holding a piece of photographic paper, and a space for recording exposure information. The sensitized side of the paper is exposed to light through the negatives in the pockets, printed, then inverted and returned to its pocket.

14 Claims, 3 Drawing Sheets

PHOTOGRAPHIC DEVICE AND METHOD FOR MAKING AND STORING PHOTOGRAPHIC CONTACT PRINTS

BACKGROUND OF THE INVENTION

This invention relates to a device and method for making photographic contact prints, for storing those prints and the negatives from which they are made, and for recording information, such as exposure time and filtration, about the manner in which the prints were made.

In the printing of photographs, particularly those taken by professional photographers and serious amateurs, the developed and dried negative film roll is cut into short strips which are then used to produce a contact print of multiple pictures on the negative roll on a single piece of photographic paper. The negatives are frequently stored in a clear plastic "preserver," together with information about the roll number, date, and subject of the images. A notebook is often kept, containing the same information and further information about the *f*-stop and shutter speed of each image, together with information about the exposure time and filtration used in making the contact print or individual enlargements. The contact prints or enlargements are generally stored in an album, utilizing special album pages made for the purpose.

Once the contact print is made, it is frequently difficult to correlate the negatives with the print because of similarities between the subjects of different rolls of film, and the difficulties of viewing a small false-color negative as compared with a true-color print. Determining the exposure and filtration data is frequently even more difficult. When multiple contact prints or several enlargements are made from the same negative roll, confusion can be even greater.

To make the contact print, the cut strips are placed in a light-transmitting carrier, the carrier is superposed on a sheet of sensitized photographic paper, the paper is exposed to light through the carrier and negatives, and the exposed paper is removed and processed to produce the contact print on the paper. The contact print is then used as a means to study the pictures on the film roll and select the pictures from which enlargements are to be made. The contact print also becomes a record of the pictures on the film strip (negatives). Generally, contact prints are stored in albums or in numerous other ways, and negatives are stored separately, with each carrying identifying information such as date and subject matter. Critical information about the contact print, such as exposure time and filtration may be written on the back of the contact print, but is generally recorded in a separate notebook.

A classical apparatus and method for making contact prints is described in Alberti, U.S. Pat. No. 2,807,199.

A more modem method is to place the cut negative strips in a flexible plastic "preserver" made of two sheets of clear plastic heat-sealed together along parallel lines to form pockets for the negative strips. The negative strips are slipped into the preserver pockets, then the preserver is aligned with a sheet of sensitized photographic paper before exposing the superposed preserver and paper to a light source, with or without filtration. After exposure, the paper is processed to produce the contact print, and the negative strips are stored in the preserver without additional handling of the negative strips. The preserver may also include an identification area along one edge which carries indicia identifying the roll number and the date and subject of the negatives. The marginal identification area may also include means for mounting the preserver, such as holes for mounting it in a three-ring notebook or tabs for mounting it in a hanging file. An example of such a preserver is product sold commercially by Print File, Inc. of Orlando, Fla. as its model 35-7B, which holds up to seven rows of five-frame 35 mm strips (thirty-five frames total) for making contact prints on 8"×10" paper. Numerous other styles and sizes are available from this and other sources for printing different numbers of prints from various film sizes.

Because color prints cannot be made with a safe light, the step of aligning the contact print with the negative strips must be carried out in total darkness. This step is therefore difficult, even if a fixture of some sort is provided.

SUMMARY OF THE INVENTION

One of the objects of this invention is to provide a method and device for making contact prints more easily than at present.

Another object is to provide such a method and device which permit negatives and contact prints to be associated with each other more easily.

Another object is to provide such a method and device which permit easy recordal and retrieval of information about the details of making the contact prints, such as exposure and filtration information.

Other objects will be apparent to those skilled in the art in light of the following description and accompanying drawings.

In accordance with one aspect of this invention, generally stated, a method of forming contact prints with a plurality of film negative strips and a sheet of sensitized paper is provided including a step of providing a generally planar unitized holder for the film strips and the sensitized paper, the unitized holder being formed of transparent flexible plastic sheets and including a plurality of first pockets on one broad side thereof for releasably holding the film strips and at least one second pocket on another broad side thereof for releasably holding the sensitized paper; a second step of inserting the negative strips into the first pockets and inserting the sensitized paper into the second pocket with a sensitized face of the paper turned to the negative strips; a third step of exposing the sensitized paper to a light source through the negative strips; a fourth step of developing an image of the negative strips on the sensitized side of the paper; and a fifth step of inserting the paper in the second pocket with the image turned away from the first pockets. The final step provides storage for the negative strips and their associated contact print in a single holder and allows easy identification of the negative strips and individual images on the negatives. Marking the holder with the exposure time and filters used in producing the contact print greatly simplifies making enlargements from the negatives. Other information such as the date and subject matter of the photographs may also be recorded on the holder.

The holder of the invention includes a first generally rectangular sheet or film of transparent flexible plastic material, a second sheet of transparent flexible plastic material bonded along a plurality of lines to the first sheet to form a plurality of parallel pockets for holding a plurality of elongate strips of photographic film, and a third sheet of transparent flexible plastic material bonded around a periphery of the first sheet to form a single pocket for holding a sheet of sensitized photographic paper. Preferably, the first pockets are formed by bonding first and second sheets along parallel lines spaced to form pockets sized to hold negative strips of a predetermined size. The combined sheets are then bonded to a third sheet around three edges to form a single pocket sized to hold a sheet of sensitized photographic paper.

Other aspects of the invention will be more easily understood in light of the following description of the preferred embodiment of the invention.

DESCRIPTION OF THE PREFERRED EMBODIMENTS

Figure 1:
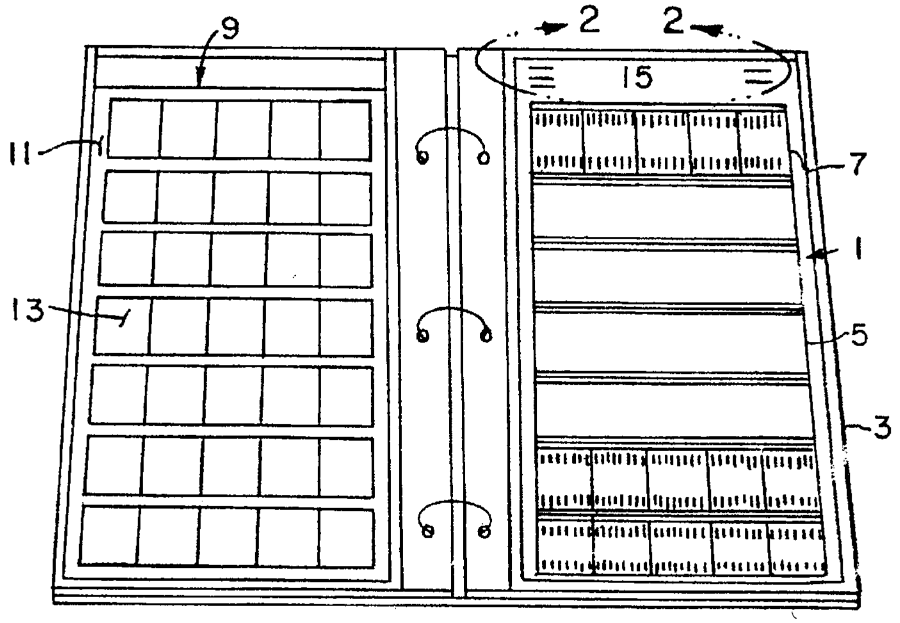
FIG. 1 is a view in perspective of one illustrative embodiment of a negative and print storage system utilizing a contact print and storage device of the present invention.

Referring now to the drawings, and in particular to FIG. 1, reference numeral 1 indicates one illustrative embodiment of combined contact print and storage device of the present invention. Two of the devices 1 are shown in a standard three-ring notebook 3 where they are stored. The illustrative device 1 includes a first set of horizontal pockets 5 holding negative strips 7 and a second pocket 9 holding a sheet of developed sensitized photographic paper 11, on which the positive images 13 of negative strips are displayed. The images 13 are those of the negatives stored in the same device 1 with the sheet 11. It is therefore possible to tell at a glance the subject of the negatives held in the device 1 and the content of each frame of the negatives.

The device 1 is formed of sheets of a transparent, flexible plastic film such as polyethylene, polypropylene, or polyurethane. Preferably, the plastic film is inert with respect to the negatives and photographic paper stored in them, in accordance with good manufacturing practice. Also preferably, the plastic film sheets are formed of a thermoplastic material which can be welded together by standard manufacturing processes such as thermal welding, ultrasonic welding, solvent welding or the like.

Figure 2:
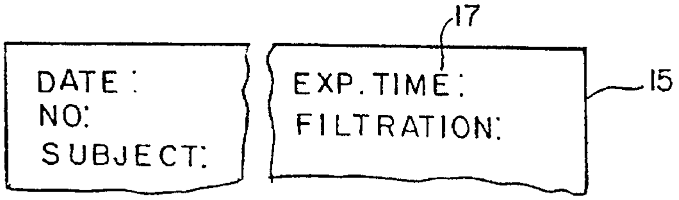
FIG. 2 is a detail showing an information strip on the device of FIG. 1.

As shown in FIG. 2, each device 1 also includes a translucent data recordal portion 15 surface treated to accept permanent ink notations and preprinted with identification headings 17 for date, roll number, and subject, and with exposure headings for recording exposure time and filtration used in making the contact print images 13.

As shown in FIGS. 3A through 3D, the device 1 is manufactured of three sheets of flexible material, illustratively transparent polyethylene film, properly pH balanced for archival storage of negatives and photographic prints. The upper sheet 21 is approximately 8" (20.3 cm) wide and 11.2" (28.4 cm) high; the middle sheet 23 is approximately 9" (22.8 cm) wide and 11.2" (28.4 cm) high; and the lower sheet 25 is approximately 9" (22.8 cm) wide and 10.7" (27 cm) high. The middle sheet 23 and lower sheet 25 are three-hole punched along their left-hand side, as shown at 27.

Figure 3A:
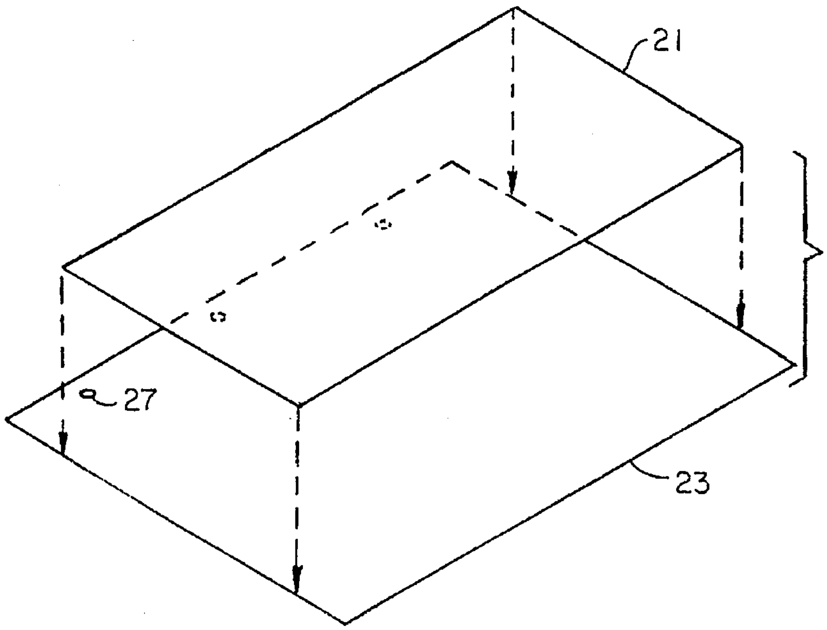
FIGS. 3A–3D are exploded views showing steps in the construction of a contact print and storage device of the present invention.

In the first manufacturing step, as shown in FIG. 3A, the upper sheet 21 and middle sheet 23 are superposed, with the right-hand margin of the upper sheet 23 spaced inward about 0.25" (6 mm) from the right-hand margin of the middle sheet 25 and the left-hand margin space inward 0.75" (1.9 cm) from the left-hand margin of the middle sheet 25.

Figure 3B:
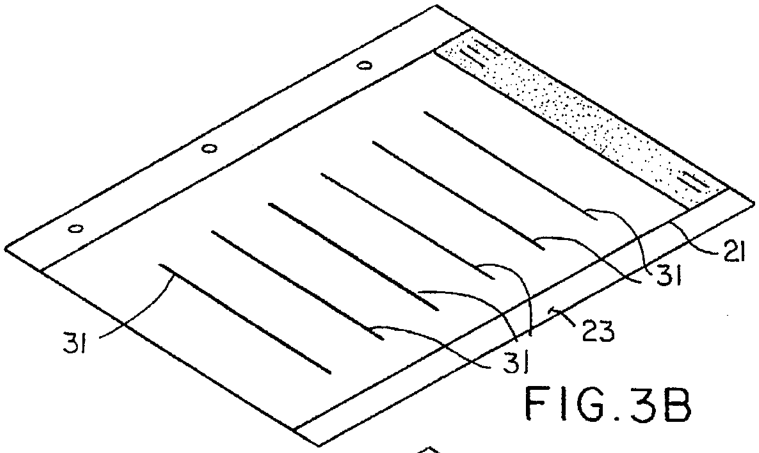

As shown in FIG. 3B, the sheets 21 and 23 are then heat sealed together along six parallel lines 31 to form the seven pockets 5. The seals 31 are narrow, linear stripes. The seals 31 extend only about 7" (17.8 cm), leaving a 0.5" (1.3 cm) free area at the ends of the pockets 5.

Figure 3C:
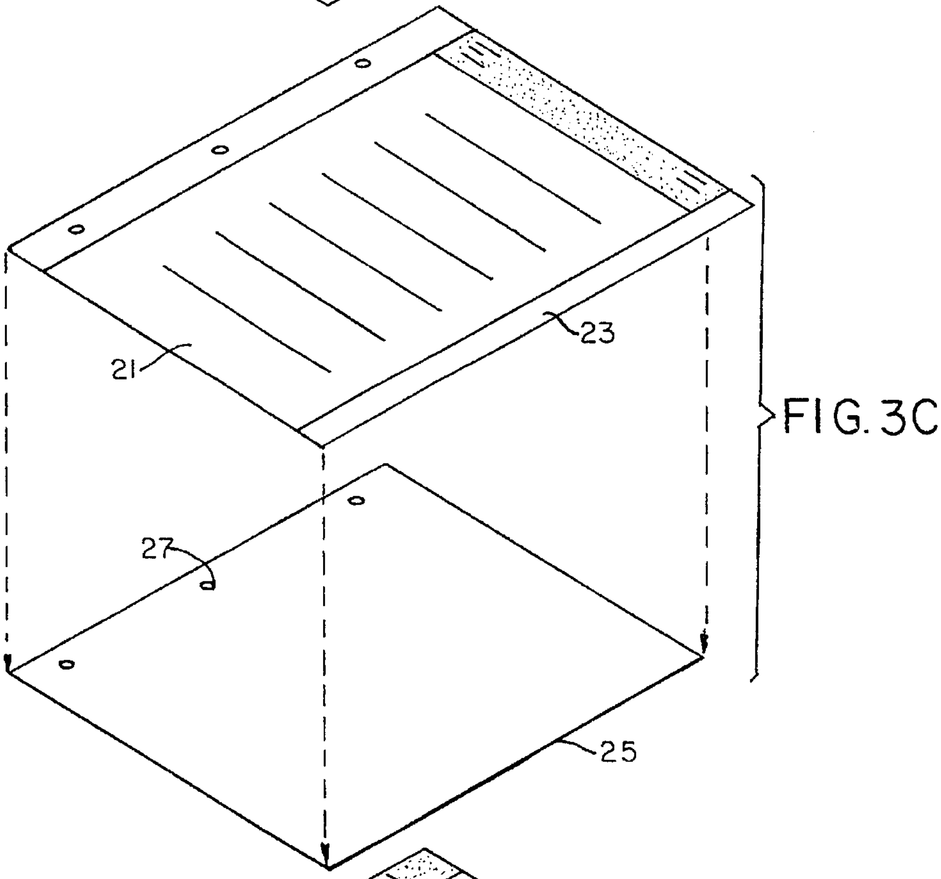

As shown in FIG. 3C, the combined sheets 21 and 23 are then superposed on the lower sheet 25, with the sides and lower edges of the sheets 23 and 25 aligned, and the upper edge of the lower sheet 25 spaced 0.5" below the top of the middle sheet 23 to facilitate insertion of a sheet of sensitized photographic paper.

Figure 3D:
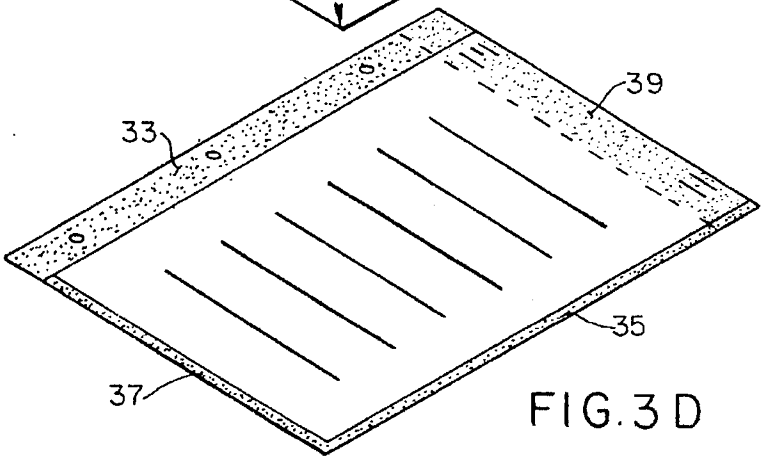
Figure 4:
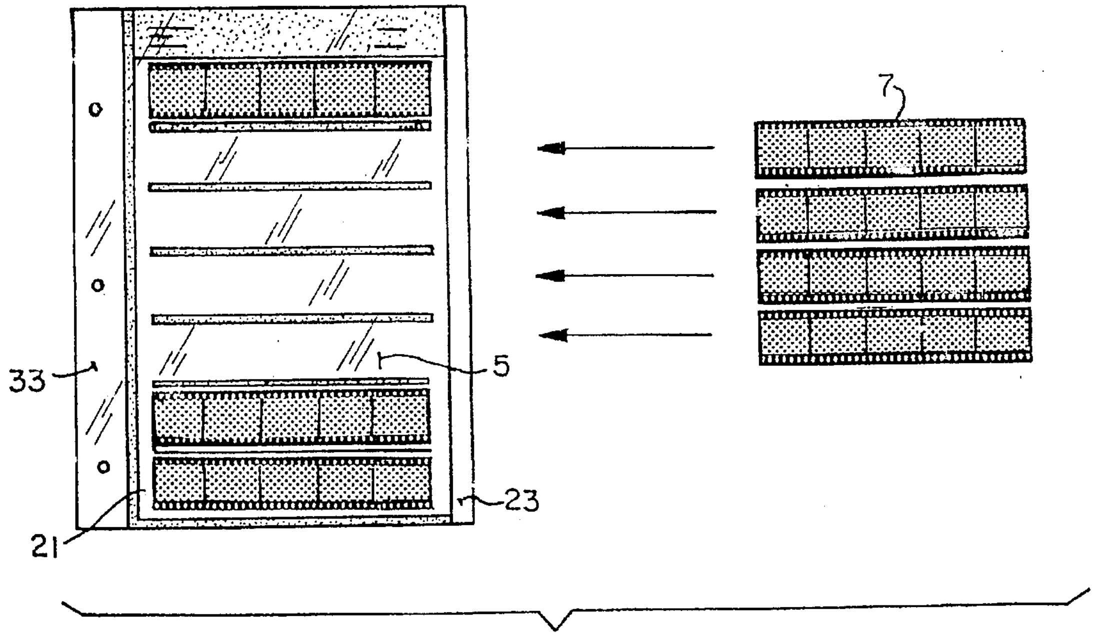
FIG. 4 is a top plan view of the device of FIGS. 1–3, showing the insertion of negative strips into pockets of the device.
Figure 5:
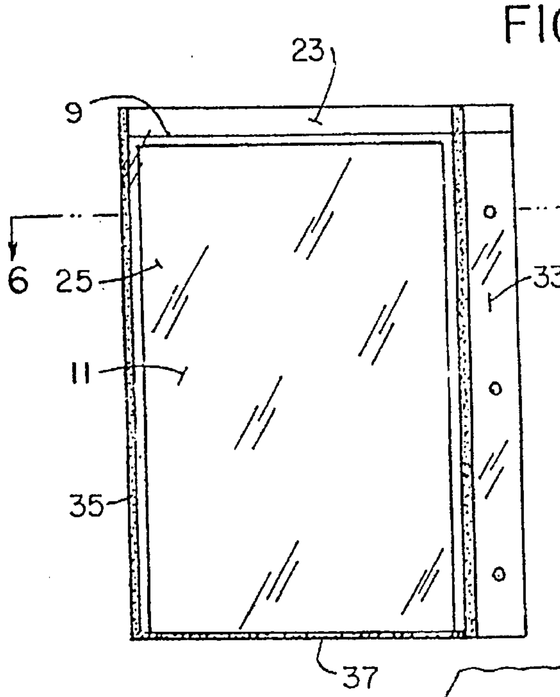
FIG. 5 is a bottom plan view of the device of FIG. 4, showing the insertion of a sheet of sensitized photographic paper with its sensitized face to the negative strips.
Figure 7:
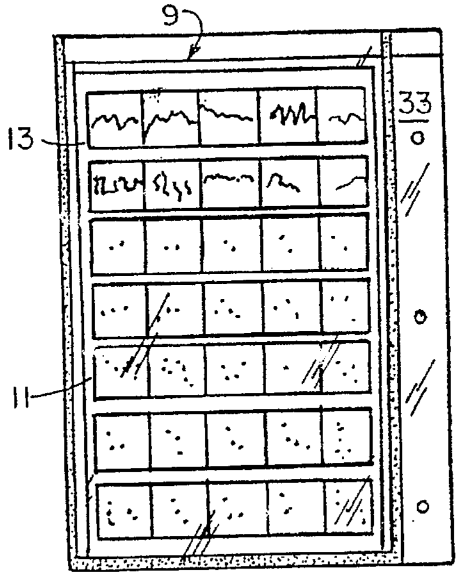
FIG. 7 is a view in bottom plan view, corresponding to FIG. 5, showing the sheet of paper inverted after development of the image on it.
Figure 6:
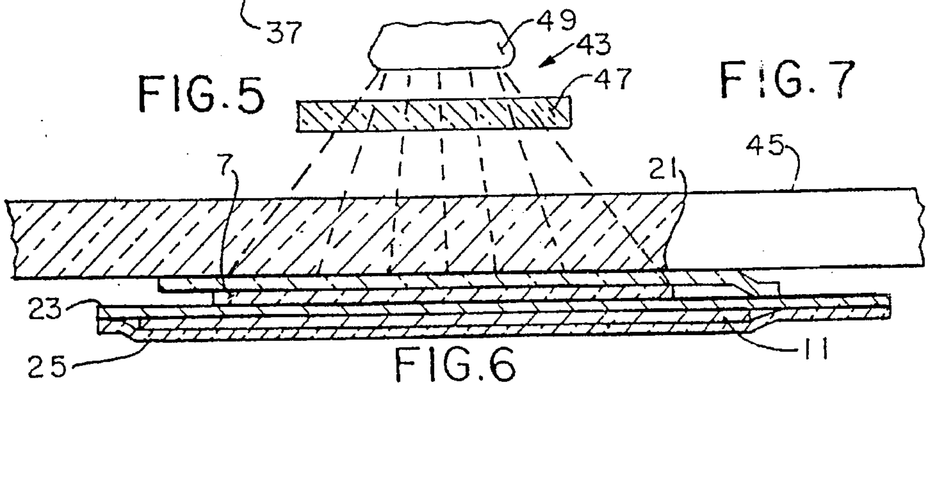
FIG. 6 is a view in end elevation of the device of FIGS. 4–5, showing the device being utilized to expose the sheet of sensitized paper through the negative strips.

The three sheets are then heat sealed to each other around the periphery of the assembly as shown in FIG. 3D. It will be seen that side seals 33 and 35 join the middle sheet 23 only to the lower sheet 25, that the lower seal 37 seals all three sheets to each other, and that the upper seal 39 seals only the top sheet 21 to the middle sheet 23. The right-hand and lower seals 33 and 37 are about 0.2" (5.1 cm) wide, and the left-hand and upper seals 35 and 39 are about 0.56" (1.4 cm) wide.

The upper margin 15 of the upper sheet 21 is preferably pretreated chemically to give it the desired translucence and to give it an ink-accepting surface and is preprinted with identification headings 17. Alternatively, the heat-sealing blade may physically roughen the surface as it forms the upper seal 39.

It will be seen that the manufacturing process produces a guide area behind the pockets 5 and 9 to facilitate inserting the negative strips 7 and paper 11 respectively. Inserting the negative strips 7 into the pockets 5 is further facilitated by the shortness of the heat seals 31, which allow the upper sheet 21 to be lifted slightly while the negative strips are inserted. The negative strips may be inserted into either end of the pockets 5; the width of the pockets 5 is sufficiently great to permit easy insertion of the strips 7 and sufficiently narrow to restrict the strips from falling out of the pockets as the device 1 is handled.

In use as a storage device, negative strips 7 are inserted into the front pockets 5 with the emulsion side of the strips against the middle sheet 23. One or more sheets of exposed and printed photographic paper, displaying images from the negative strips, are then inserted into the pocket 9 with the emulsion (image) side against the lower sheet 25 so as to be visible when the device 1 is turned over for easy viewing and storage in a notebook 1.

During the printing process, the negative strips 7 are inserted into the pockets 5 as previously described with their emulsion side down. In the darkroom, a sheet of photographic paper 11 is inserted into the lower pocket 9 with the shiny or emulsion side of the paper facing the emulsion side of the negatives 7. The loaded device 1 is then positioned on the base 41 of an enlarger 43, preferably under a piece of glass 45 to hold the negatives flat and secure against the paper. If desired, the glass may be hinged to a tray which holds the device 1. Any desired filters 47 are positioned under a light 49 in the enlarger 43, and the light is turned on for a predetermined exposure time. After exposure, the photographic paper 11 is removed from the device 1 and the positive images produced on it are developed or printed in the usual manner. After the paper 11 has dried, it is turned over and reinserted into the pocket 9 print-side out for storage and easy viewing. Exposure time and filter settings (such as filters used in black-and-white photography or diachronic filter settings for color prints) are immediately recorded on the header 15 to enable easy reference for later enlargements. It will be seen that the delicate negatives 7 are handled only once, before exposure of the paper, and are thereafter kept protected in the pockets 5.

Numerous variations in the photographic device of the present invention, within the scope of the appended claims, will occur to those skilled in the art in light of the foregoing description. Merely by way of example, the device may be made of other stable, inert thermoplastic materials. The welds may be formed by other methods and in other orders. The welds may form non-continuous lines. The data entry area or areas may be along other margins or between the negative pockets 5, in which case exposure data for individual negatives could also be transcribed. The upper sheet 21 may be made the same size as the middle sheet 23 and openings for pockets 5 may then be formed as slits, either at the ends of the pockets 5 or along their upper edges for vertical insertion of negative strips into the horizontal pockets. The number and size of the pockets may be varied for film of different sizes (such as 120 film or slides), and the pockets may be vertical rather than horizontal. The size of the device may be changed to accommodate different types of film and different sizes of photographic paper. Hanging strips may be substituted for the three-hole binding system, or the left-hand margin 35 may be sealed along spaced-apart lines to enable optional insertion of a hanging strip through the margin 35. Enlargements as well as, or in place of, contact prints may be stored in the back pocket 9. Other materials, such as notes on exposure of the negatives, type of print paper utilized, or informative printed material may also be stored in the pocket 9. These variations are merely illustrative.

I claim:

1. A combined holder for making photographic contact prints and for storing negatives and their associated prints, the holder comprising a first generally rectangular sheet of transparent flexible plastic material, a second sheet of transparent flexible plastic material bonded along a plurality of lines to the first sheet to form a plurality of continuous elongate parallel pockets, each continuous elongate pocket extending generally across the sheet from adjacent a first margin of the sheet to adjacent an opposite margin of the sheet for holding an elongate strip of photographic film, and a third sheet of transparent flexible plastic material bonded adjacent at least a part of a periphery of the second sheet to form a single pocket for holding a sheet of sensitized photographic paper, the sheets being bonded such that an image on each strip of photographic film in each elongate pocket can be exposed on the photographic paper in the single pocket.

2. The device of claim 1 further including a translucent, ink-accepting area on the device for recording exposure and filtration information.

3. The device of claim 1 further including means for mounting the device with a plurality of other such devices in a storage container.

4. The device of claim 3 wherein the mounting means comprise holes in a margin of the device.

5. The device of claim 1 wherein the parallel pockets are open at least one end.

6. The device of claim 5 wherein the first sheet of transparent material is narrower than the second sheet.

7. A combined holder for making photographic contact prints and for storing negatives and their associated prints, the holder comprising a first set of parallel transparent pockets sized to hold negative strips, a second transparent pocket, said second pocket being sized and positioned to hold a sheet of photographic paper flush against the negative strips for exposure of the paper through the negative strips, and a translucent, ink-accepting area on the device for recording information about the exposure and filtration used in exposure of the paper through the negative strips.

8. A method of forming contact prints with a plurality of film negative strips and a sheet of sensitized paper, the method comprising a step of providing a generally planar unitized holder for the film strips and the sensitized paper, the unitized holder being formed of transparent flexible plastic sheets and including a plurality of first pockets on one broad side thereof for releasably holding the film strips and at least one second pocket on another broad side thereof for releasably holding the sensitized paper; a second step of inserting the negative strips into the first pockets and inserting the sensitized paper into the second pocket with a sensitized face of the paper turned to the negative strips; a third step of exposing the sensitized paper to a light source through the negative strips; a fourth step of developing an image of the negative strips on the sensitized side of the paper; and a fifth step of inserting the paper in the second pocket with the image turned away from the first pockets.

9. The method of claim 8 including a further step of recording exposure information on the holder.

10. In combination, a holder for making photographic contact prints and for storing negatives and their associated prints, the holder comprising a first generally rectangular sheet of transparent flexible plastic material, a second sheet of transparent flexible plastic material bonded along a plurality of lines to the first sheet to form a plurality of parallel pockets for holding a plurality of elongate strips of photographic film, and a third sheet of transparent flexible plastic material bonded adjacent at least a part of a periphery of the second sheet to form a single pocket for holding a sheet of sensitized photographic paper;

a plurality of elongate strips of photographic film in the parallel pockets; and a single sheet of photographic paper in the single pocket, the photographic paper carrying images corresponding to images on the strips of photographic film.

11. A combined holder for making photographic contact prints and for storing negatives and their associated prints, the holder comprising a first generally rectangular sheet of transparent flexible plastic material, a second sheet of transparent flexible plastic material, the second sheet being wider than the first sheet, a side margin of the first sheet being spaced inward from a side margin of the second sheet, the first sheet being bonded along a plurality of bond lines to the second sheet to form a plurality of parallel pockets for holding a plurality of elongate strips of photographic film, the parallel pockets extending generally across the first sheet, and a third sheet of transparent flexible plastic material bonded around at least a part of a periphery of the second sheet to form a single pocket for holding a sheet of sensitized photographic paper, the second sheet being bonded along at least one side margin to the third sheet but not to the first sheet.

12. The holder of claim 11 wherein each of the plurality of lines ends short of the side margin of the first sheet, leaving a flap of the first sheet at an open end of the parallel pockets.

13. A method of forming contact prints with a plurality of film negative strips and a sheet of sensitized paper, the method comprising a step of providing a generally planar unitized holder for the film strips and the sensitive paper, the unitized holder being formed of transparent flexible plastic sheets and including a plurality of first pockets on one broad side thereof for releasably holding the film strips and at least one second pocket on another broad side thereof for releasably holding the sensitized paper; a second step of inserting the negative strips into the first pockets and inserting the sensitized paper into the second pocket with a sensitized face of the paper turned to the negative strips; a third step of exposing the sensitized paper to a light source through the negative strips; and a fourth step of developing an image of the negative strips on the sensitized side of the paper.

14. The method of claim 13 wherein the step of providing a generally planar unitized holder comprises, bonding a first generally rectangular sheet of transparent flexible thermoplastic film to a second sheet of transparent flexible plastic film along a plurality of parallel lines to form the plurality of first pockets, and bonding a third sheet of transparent flexible plastic film to the second sheet to form the second pocket.

* * * * *